(12) United States Patent
Callahan et al.

(10) Patent No.: US 8,250,782 B2
(45) Date of Patent: Aug. 28, 2012

(54) VALVE FOR REGULATING PRESSURE IN A FLUID SYSTEM

(75) Inventors: Erica Callahan, Medford, MA (US); William Marvin, Canton, MA (US); Dennis Gaboriault, Millbury, MA (US)

(73) Assignee: Reebok International Limited, London (GB)

( * ) Notice: Subject to any disclaimer, the term of this patent is extended or adjusted under 35 U.S.C. 154(b) by 603 days.

(21) Appl. No.: 12/412,094

(22) Filed: Mar. 26, 2009

(65) Prior Publication Data
US 2010/0242303 A1    Sep. 30, 2010

(51) Int. Cl.
A43B 13/20  (2006.01)
A43B 7/14  (2006.01)

(52) U.S. Cl. .................. 36/29; 36/93; 36/88; 36/114

(58) Field of Classification Search ............ 36/28, 29, 36/35 R, 25 R, 93, 88
See application file for complete search history.

(56) References Cited

U.S. PATENT DOCUMENTS

| D32,093 S | 1/1900 | Childs |
|---|---|---|
| 1,235,645 A | 8/1917 | Blatz et al. |
| 1,285,695 A | 11/1918 | Harman |
| 1,322,338 A | 11/1919 | Pitts |
| 1,369,555 A | 2/1921 | Schweinert et al. |
| 1,444,189 A | 2/1923 | Key |
| 1,450,934 A | 4/1923 | Wilson |
| 1,531,731 A | 3/1925 | Burgess |
| 1,818,178 A | 8/1931 | Weisberg |
| 2,942,614 A | 6/1960 | Lardner |
| 2,949,927 A | 8/1960 | Mackal |
| 2,982,448 A | 5/1961 | Leonard et al. |
| 3,078,679 A | 2/1963 | Mortimer et al. |
| 3,080,094 A | 3/1963 | Modderno |
| 3,658,208 A | 4/1972 | Hansen |
| 3,721,265 A | 3/1973 | Hoffland |
| 3,776,227 A | 12/1973 | Pitesky et al. |
| 3,983,907 A | 10/1976 | Sorensen |
| 3,985,155 A | 10/1976 | Nightingale |

(Continued)

FOREIGN PATENT DOCUMENTS

DE    3205264    8/1983

(Continued)

OTHER PUBLICATIONS

U.S. Appl. No. 11/610,382, filed Dec. 13, 2006.

(Continued)

*Primary Examiner* — Jila M Mohandesi
(74) *Attorney, Agent, or Firm* — Sterne, Kessler, Goldstein & Fox P.L.L.C.

(57) ABSTRACT

An article of footwear with an inflatable system may have a valve incorporated therein to adjust the level of cushioning in the article of footwear. The valve may be in communication with an inflatable bladder and may have a body, a piston, and an interface. The body may have an interior chamber, a fluid inlet, and a fluid outlet. The piston may be located within the interior of the body and can be spring actuated. The interface may be connected to the body such that movement of the interface between a first position and a second position results in the piston moving between a first position wherein fluid is permitted to enter the interior chamber at a first rate and a second position wherein fluid is permitted to enter at a second rate, wherein the first rate is greater than the second rate.

18 Claims, 9 Drawing Sheets

U.S. PATENT DOCUMENTS

| | | | | |
|---|---|---|---|---|
| 3,993,099 | A | 11/1976 | Nightingale | |
| 3,996,957 | A | 12/1976 | Goldish et al. | |
| 4,088,147 | A | 5/1978 | Krechel et al. | |
| D249,279 | S | 9/1978 | Backlund | |
| 4,370,997 | A | 2/1983 | Bralthwaite et al. | |
| 4,397,104 | A | 8/1983 | Doak | |
| 4,457,335 | A | 7/1984 | Trick | |
| 4,579,141 | A | 4/1986 | Arff | |
| D285,716 | S | 9/1986 | Bova | |
| 4,669,498 | A | 6/1987 | Hansen | |
| 4,694,850 | A | 9/1987 | Fumino | |
| 4,729,543 | A | 3/1988 | Aricha | |
| 4,778,595 | A | 10/1988 | Sable et al. | |
| D299,379 | S | 1/1989 | Haggerty et al. | |
| 4,877,057 | A | 10/1989 | Christensen | |
| 4,934,543 | A | 6/1990 | Schmidt | |
| 4,969,493 | A | 11/1990 | Lee | |
| D314,172 | S | 1/1991 | Whitley, II | |
| 4,995,124 | A | 2/1991 | Wridge, Jr. et al. | |
| 5,012,954 | A | 5/1991 | Will | |
| 5,020,395 | A | 6/1991 | Mackey | |
| 5,022,565 | A | 6/1991 | Sturman et al. | |
| 5,060,694 | A | 10/1991 | Florida et al. | |
| 5,113,599 | A * | 5/1992 | Cohen et al. | 36/88 |
| 5,121,840 | A | 6/1992 | Schram | |
| 5,135,025 | A | 8/1992 | Mackal | |
| 5,144,708 | A * | 9/1992 | Pekar | 137/223 |
| 5,234,015 | A | 8/1993 | Fumino | |
| 5,253,435 | A * | 10/1993 | Auger et al. | 36/88 |
| D341,189 | S | 11/1993 | Legassie et al. | |
| 5,257,470 | A * | 11/1993 | Auger et al. | 36/88 |
| 5,351,710 | A | 10/1994 | Phillips | |
| 5,353,525 | A * | 10/1994 | Grim | 36/88 |
| 5,406,661 | A * | 4/1995 | Pekar | 5/655.3 |
| 5,794,361 | A | 8/1998 | Sadler | |
| 5,813,144 | A | 9/1998 | Prengler | |
| 5,937,462 | A | 8/1999 | Huang | |
| 5,987,779 | A * | 11/1999 | Litchfield et al. | 36/29 |
| 6,125,556 | A * | 10/2000 | Peckler et al. | 36/127 |
| 6,409,487 | B1 | 6/2002 | Baek | |
| 6,425,195 | B1 | 7/2002 | Donzis | |
| 6,510,624 | B1 | 1/2003 | Lakic | |
| 6,519,873 | B1 | 2/2003 | Buttigieg | |
| 6,553,691 | B2 | 4/2003 | Huang | |
| 6,638,038 | B2 | 10/2003 | Baek | |
| 6,725,573 | B2 | 4/2004 | Doyle | |
| 6,785,985 | B2 * | 9/2004 | Marvin et al. | 36/45 |
| 6,848,200 | B1 | 2/2005 | Westin | |
| 6,865,825 | B2 | 3/2005 | Bailey, Sr. et al. | |
| 7,013,585 | B2 | 3/2006 | Lo | |
| 7,017,285 | B2 | 3/2006 | Lakic | |
| 7,107,706 | B1 | 9/2006 | Bailey, Sr. et al. | |
| 7,188,439 | B2 | 3/2007 | DiBenedetto et al. | |
| 7,204,041 | B1 * | 4/2007 | Bailey et al. | 36/29 |
| 7,395,614 | B1 * | 7/2008 | Bailey et al. | 36/28 |
| 7,694,438 | B1 * | 4/2010 | Christensen et al. | 36/29 |
| 7,934,521 | B1 * | 5/2011 | Busse et al. | 137/884 |
| 2003/0084593 | A1 | 5/2003 | Lakic | |
| 2004/0088882 | A1 | 5/2004 | Buttigieg | |
| 2006/0196081 | A1 | 9/2006 | Lee | |
| 2007/0137065 | A1 | 6/2007 | Vera | |

FOREIGN PATENT DOCUMENTS

| | | |
|---|---|---|
| GB | 887832 | 1/1962 |

OTHER PUBLICATIONS

U.S. Appl. No. 11/613,982, filed Dec. 20, 2006.

* cited by examiner

VALVE FOR REGULATING PRESSURE IN A FLUID SYSTEM

BACKGROUND OF THE INVENTION

1. Field of the Invention

Disclosed herein is a valve for regulating pressure in a fluid system. The fluid system may be incorporated into an article of footwear.

2. Background Art

Athletic footwear must provide stable and comfortable support for the body while subject to various types of stress. It is important that the shoe be comfortable and provide support during various foot movements associated with athletic activity.

One of the problems associated with footwear, especially athletic shoes, has always been striking a balance between support and cushioning. Throughout the course of an average day, the feet and legs of an individual are subjected to substantial impact forces. Running, jumping, walking, and even standing exert forces upon the feet and legs of an individual which can lead to soreness, fatigue, and injury.

The human foot is a complex and remarkable piece of machinery, capable of withstanding and dissipating many impact forces. The natural padding of fat at the heel and forefoot, as well as the flexibility of the arch, help to cushion the foot.

An athlete's stride is partly the result of energy which is stored in the flexible tissues of the foot. For example, a typical gait cycle for running or walking begins with a "heel strike" and ends with a "toe-off". During the gait cycle, the main distribution of forces on the foot begins adjacent to the lateral side of the heel (outside of the foot) during the "heel strike" phase of the gait, then moves toward the center axis of the foot in the arch area, and then moves to the medial side of the forefoot area (inside of the foot) during "toe-off". During a typical walking or running stride, the achilles tendon and the arch stretch and contract, storing and releasing energy in the tendons and ligaments. When the restrictive pressure on these elements is released, the stored energy is also released, thereby reducing the burden which must be assumed by the muscles.

Although the human foot possesses natural cushioning and rebounding characteristics, the foot alone is incapable of effectively overcoming many of the forces encountered during athletic activity. Unless an individual is wearing shoes which provide proper cushioning and support, the soreness and fatigue associated with athletic activity is more acute, and its onset accelerated. The discomfort for the wearer that results may diminish the incentive for further athletic activity. Equally important, inadequately cushioned footwear can lead to injuries such as blisters; muscle, tendon and ligament damage; and bone stress fractures. Improper footwear can also lead to other ailments, including back pain.

Proper footwear should complement the natural functionality of the foot, in part, by incorporating a sole (typically including an outsole, midsole and insole) which absorbs shocks. However, the sole should also possess enough resiliency to prevent the sole from being "mushy" or "collapsing," thereby unduly draining the stored energy of the wearer.

In light of the above, numerous attempts have been made to incorporate into a shoe improved cushioning and resiliency. For example, attempts have been made to enhance the natural resiliency and energy return of the foot by providing shoes with soles which store energy during compression and return energy during expansion. These attempts have included the formation of shoe soles that include springs, gels or foams such as ethylene vinyl acetate (EVA) or polyurethane (PU). However, all of these tend to either break down over time or do not provide adequate cushioning characteristics.

Another concept practiced in the footwear industry to improve cushioning and energy return has been the use of fluid-filled systems within shoe soles. These devices attempt to enhance cushioning and energy return by transferring a pressurized fluid between the heel and forefoot areas of a shoe. The basic concept of these devices is to have cushions containing pressurized fluid disposed adjacent the heel and forefoot areas of a shoe.

However, a cushioning device which is pressurized with fluid at the factory is comparatively expensive to manufacture. Further, pressurized fluid tends to escape from such a cushioning device, requiring large molecule fluids such as Freon gas to be used as the inflating fluid. A cushioning device which contains air at ambient pressure provides several benefits over similar devices containing pressurized fluid. For example, generally a cushioning device which contains air at ambient pressure will not leak and lose air, because there is no pressure gradient in the resting state.

Inflatable systems have been utilized in the upper and sole of an article of footwear to improve the fit and/or cushioning of such footwear, as shown for example in U.S. Pat. No. 6,785,985 to Marvin et al. Typically, an inflatable system for footwear includes a bladder, an inflation mechanism, a deflation mechanism, and one or more one-way valves to control airflow through the system. U.S. Pat. No. 6,785,985 to Marvin et al. is an example of such an inflatable system for footwear.

Inflatable systems have also been utilized in the upper of an article of footwear to improve the fit, as shown for example in U.S. Pat. No. 6,785,985 to Marvin et al.

However, each individual wearing footwear with an inflatable system, either for fit or cushioning, may desire a different amount of inflation for proper fit and/or cushioning. The individual may also desire varying amounts of cushioning based on an intended use when wearing the article of footwear for a variety of activities. Therefore, there exists a need in the art to be able to adjust the pressure within an inflatable fluid system.

BRIEF SUMMARY OF THE INVENTION

Disclosed herein is an article of footwear comprising a bladder and a valve in communication with the bladder. The valve can comprise a body, a piston (e.g., a spring actuated piston), and an interface. The body has a first end, a second end, and an interior chamber, wherein the second end of the body has a fluid inlet in communication with the bladder and a fluid outlet. The piston has a first end and a second end and the piston is located within the interior chamber of the body. In some embodiments, the piston is spring actuated. For example, a spring can be located between the body and the piston or between the body and the interface. The interface is connected to the first end of the body and movement of the interface between a first position and a second position results in the piston moving between a first position wherein fluid is permitted to enter the interior chamber at a first rate and a second position wherein fluid is permitted to enter the interior chamber at a second rate. The first rate is greater than the second rate. In some embodiments, the second rate is about zero.

Also disclosed herein is a fluid transfer system comprising a fluid transfer manifold and a valve connected to the fluid transfer system. The valve comprises a body, a piston, and an interface. The body has a first end, a second end, and an interior chamber, wherein the second end of the body has a fluid inlet in communication with the bladder and a fluid outlet. The piston has a first end and a second end and the piston is located within the interior chamber of the body. In some embodiments, the piston is spring actuated. For example, a spring can be located between the body and the piston or between the body and the interface. The interface is connected to the first end of the body and movement of the interface between a first position and a second position results in the piston moving between a first position wherein fluid is permitted to enter the interior chamber at a first rate and a second position wherein fluid is permitted to enter the interior chamber at a second rate. The first rate is greater than the second rate. In some embodiments, the second rate is about zero.

In addition, disclosed herein is a valve for adjusting pressure in a fluid transfer system. The valve comprises a body, a piston, and a means for moving the piston. The body has a first end, a second end, and an interior chamber, wherein the second end of the body has a fluid inlet in communication with the bladder and a fluid outlet. The piston has a first end and a second end and the piston is located within the interior chamber of the body. The means for moving the piston moves the piston between a first position wherein fluid is permitted to enter the interior chamber at a first rate and a second position wherein fluid is permitted to enter the interior chamber at a second rate. The first rate is greater than the second rate. In some embodiments, the second rate is about zero.

A further disclosure herein is a rocker valve comprising a body, a piston, and a rocker. The body has a first end, a second end, and an interior chamber, wherein the second end of the body has a fluid inlet in communication with the bladder and a fluid outlet. The piston has a first end and a second end and the piston is located within the interior chamber of the body. In some embodiments, the piston is spring actuated. For example, a spring can be located between the body and the piston or between the body and the interface. The rocker is connected to the first end of the body and rocking of the rocker between a first position and a second position results in the piston moving between a first position wherein fluid is permitted to enter the interior chamber at a first rate and a second position wherein fluid is permitted to enter the interior chamber at a second rate. The first rate is greater than the second rate. In some embodiments, the second rate is about zero.

BRIEF DESCRIPTION OF THE DRAWINGS/FIGURES

The accompanying drawings are incorporated herein and form part of the specification. Together with the detailed description, the drawings further serve to explain the principles of and to enable a person skilled in the relevant art(s) to make and use the devices presented herein.

DETAILED DESCRIPTION OF THE INVENTION

Figure 1:
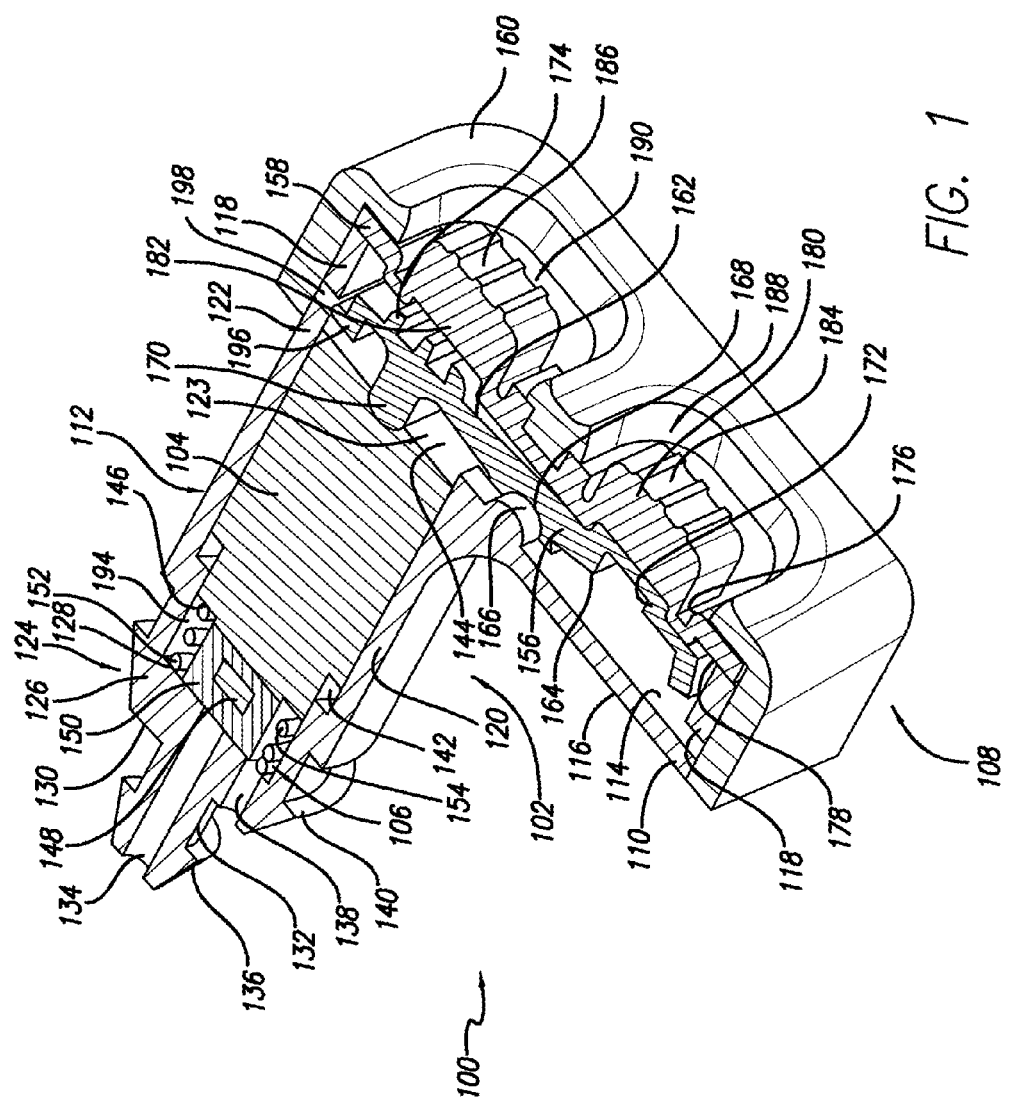
FIG. 1 is a cross-sectional view of an exemplary assembled valve according to a first embodiment.

The present invention is now described with reference to the Figures, in which like reference numerals are used to indicate identical or functionally similar elements. Also in the Figures, the left most digit of each reference numeral corresponds to the Figure in which the reference numeral first appears. While specific configurations and arrangements can be used without departing from the spirit and scope of the invention, it will be apparent to a person skilled in the relevant art that this invention can also be employed in other applications.

Valves according to the present invention may be incorporated into an inflatable system, including one or more bladders, of an article of footwear to regulate a fluid pressure in the inflatable system. Exemplary inflatable systems are described in U.S. patent application Ser. No. 11/610,382 entitled "Article of Footwear Having an Adjustable Ride" and also in U.S. Pat. No. 6,785,985 to Marvin et al., the disclosures of which are incorporated herein by reference in their entirety. A valve 100 according to a first embodiment will be described with reference to FIGS. 1-4. The valve 100 may have a body 102, a piston 104, and an interface 108.

The body 102 may have a base 110 and a stem 112. Body 102, base 110 and stem 112 may be generally any shape. For example, body 102, base 110, or stem 112 may be generally rectangular, square, elliptical, or circular in cross-section. Body 102, base 110, or stem 112 may have a uniform cross-sectional shape and size or the cross-sectional shape and size of body 102, base 110, or stem 112 can vary along the length of the component. In some embodiments, stem 112 is generally cylindrical. The body 102 may be made of any suitable material including, but not limited to, plastics (e.g., thermoplastics and thermosetting plastics), metals, and combinations thereof. For example, body 102 can include polycarbonate, thermoplastic polyurethane (TPU), acetyl polymer, and combinations thereof.

The base 110 may have a first surface 114 and a second surface 116. A wall 118 may extend from the first surface 114 around a periphery of the base 110. The stem 112 may be connected to the base 110 and may comprise a wall 120 extending from a portion of the second surface 116 such that a first end 122 of the stem 112 is adjacent the second surface 116 of the base 110. The base 110 may have an opening 123 extending from the first surface 114 to the second surface 116 that may be surrounded by the wall 120 of the stem. A second end 124 of the stem 112 may be formed from an end component 126 having a first end surface 128 and a second end surface 130. An extension 132 may extend from the second end surface 130 with a fluid inlet opening 134 formed in the extension 132 that extends through the end component 126. The extension 132 may have a barb 136 for maintaining fluid inlet opening 134 within a fluid passage of a fluid system and to create a sealed system. A fluid outlet opening 138 may be formed in the end component 126 of the stem 112. The wall 120 may extend from the first end 122 to the second end 124 of the stem 112. The stem 112 may also have a barb 140 adjacent the second end 124 for maintaining the valve 100 within a fluid system when the body 102 is inserted therein. In some embodiments, opening 134 could function as a fluid outlet and opening 138 could function as a fluid inlet.

The body 102 may have an interior chamber 142 bounded by the wall 118 extending from the first surface 114 of the base 110, the wall 120 of the stem 112, and the first end surface 128 of the end component 126 of the stem 112. The body 102 and the interior chamber 142 may have an upside down L-shape such that a portion of the base 110 has the stem 112 located directly beneath it and a portion of the base 110 extends laterally away the stem 112. The fluid inlet opening 134 and the fluid outlet opening 138 may be in communication with the interior chamber 142.

The piston 104 is slidably positioned within the stem 112 in the interior chamber 142 of the body 102. Piston 104 may be made of any suitable material including, but not limited to, plastics (e.g., thermoplastics and thermosetting plastics), rubbers, metals, and combinations thereof. For example, piston 104 can include polycarbonate, thermoplastic polyurethane (TPU), acetyl polymer, polytetrafluoroethylene, and combinations thereof. In some embodiments, piston 104 includes one or more low friction materials. The piston 104 may have a first surface 144 and a second surface 146 with an extension 148 extending from the second surface 146. The piston 104 and extension 148 may be generally any shape. For example, piston 104 and extension 148 may be generally rectangular, square, elliptical, or circular in cross-section. Piston 104 and extension 148 may have uniform cross-sectional shapes and sizes or the cross-sectional shapes and sizes of piston 104 and extension 148 can vary along the lengths of the components. In one embodiment, piston 104 may be cylindrical in shape and the extension 148 may also be cylindrical in shape.

An overmold 150 may optionally surround the extension 148 and contact the second surface 146 of the piston such that, for example, the overmold 150 may appear cylindrical in shape when covering a cylindrical piston. Overmold 150 can include various materials such as, for example, polycarbonate, thermoplastic polyurethane (TPU), acetyl polymer, polytetrafluoroethylene, and combinations thereof, or other materials that can provide a good seal of fluid inlet opening 134 or that release easily from the materials or structures at or on end surface 128. In some embodiments, extension 148 includes at least one hole extending into or through extension 148 such that when a material is overmolded onto extension 148, the material fills the hole and the overmold is thereby held tight to the extension 148.

In some embodiments, a seal (e.g., an elastomeric, rubber, or polytetrafluoroethylene pad or ring) for blocking or covering fluid inlet opening 134 is attached to an end of piston 104. For example, piston 104 can include a groove for holding an O-ring seal. In other embodiments, piston 104 is adapted for holding a pad-style seal. Generally, piston 104, extension 148, overmold 150, or seal (not shown) opens and closes fluid inlet opening 134 when the piston slides within the stem 112. In some embodiments, piston 104, extension 148, overmold 150, or seal (not shown) closes fluid inlet opening 134 by making contact with end surface 128 when the piston slides within the stem 112. In other embodiments, piston 104, extension 148, overmold 150, or seal (not shown) closes fluid inlet opening 134 by making contact with a structure (e.g., a raised ring or gasket surrounding the opening of fluid inlet opening 134) (not shown) on end surface 128 when the piston slides within the stem 112.

The piston 104 may have one or more guides (not shown) extending from the side for engagement with one or more guide grooves (not shown) within the wall 120 of the stem 112 in the interior chamber 142 for guiding the movement of the piston 104 as it moves up and down within the stem 112. Alternatively, the piston 104 may have one or more guide grooves (not shown) for engagement with one or more guides (not shown) on wall 120 in interior chamber 142 for guiding the movement of piston 104.

In some embodiments, piston 104 is spring actuated. For example, valve 100 can include a spring 106 positioned between body 102 and piston 104. Valve 100 can include one or more of various springs including, but not limited to, tension springs, compression springs, wire springs, coil springs, helical springs, flat springs, leaf springs, gas springs, band springs (e.g., rubber bands or other elastic bands), other elastic materials, and combinations thereof. In some embodiments, spring 106 may be a coil spring having a first end 152 and a second end 154 and may be made out of a suitable material including, but not limited to, stainless steel. The spring 106 may be positioned within the stem 112 in the interior chamber 142 of the body 102 between the end component 126 at the second end 124 of the stem 112 and the piston 104. The first end 152 of the spring 106 may contact the second surface 146 of the piston 104 and may surround the overmold 150. The second end 154 of the spring 106 may contact the first end surface 128 of the end component 126 at the second end 124 of the stem 112 and may surround the fluid inlet opening 134. The spring 106 biases the piston 104 away from the fluid inlet opening 134 and can decompress and can be compressed as the piston 104 moves up and down, respectively, within the stem 112. In other embodiments, a spring may be positioned at first end 122 of stem 112 and above piston 104 such as, for example, between piston 104 and rocker 156. In such embodiments, the spring can bias piston 104 toward fluid inlet opening 134 and can be compressed and can decompress as the piston 104 moves up and down, respectively, within the stem 112. In yet other embodiments, spring 106 may be positioned between first surface 114 and rocker 156. In such embodiments, the spring can bias the piston 104 toward fluid inlet opening 134 and can be compressed and can decompress as the piston 104 moves up and down, respectively, within the stem 112.

In other embodiments, a spring is located within piston 104. For example, a coil spring can be located in a cavity within the piston and a portion of the spring can be linked to stem 112 by a structure (e.g., an arm or pin) extending through an aperture in the piston (e.g., a slot) and fixed to stem 112 such that the piston moves up and down within the stem 112 as the spring compresses and decompresses.

The interface 108 is connected to the base 110 of the body 102 and may contact the piston 104 such that when the interface 108 is moved between a first position and a second position, the piston 104 moves between a first position and a second position. The interface may include a rocker 156, a gasket 158, and a cap 160. The rocker 156 has a first surface 162 and a second surface 164 and may be made of any suitable material including, but not limited to, plastics (e.g., thermoplastics and thermosetting plastics), rubbers, metals, and combinations thereof. For example, rocker 156 can include polycarbonate, thermoplastic polyurethane (TPU), acetyl polymer, and combinations thereof. The second surface 164 of the rocker 156 may contact the first surface 114 of the base 110. The first surface 114 of the base 110 may have a raised portion 166 that acts as a fulcrum for the rocker 156. The raised portion 166 is located adjacent the opening 123 in the base 110. The second surface 164 of the rocker may have a groove 168 that corresponds to the shape of the raised portion 166. The second surface 164 of the rocker 156 may also have a tab 170 extending therefrom adjacent the groove 168. The rocker 156 may be positioned in the body 102 such that the groove 168 is aligned with the raised portion 166 and such that the tab 170 extends into the opening 123 leading to the stem 112.

The first surface 162 of the rocker 156 may have a first extension 172 and a second extension 174 extending therefrom. The first and second extensions 172, 174 may extend from the first surface 162 of the rocker 156 on opposite sides of where the groove 168 is located on the second surface 162 of the rocker. The second extension 174 may be located on the same side of a plane that intersects and is perpendicular to the groove 168 as the tab 170 and the first extension 172 may be located on the opposite side of the plane.

The gasket 158 may be any suitable flexible material including, but not limited to, thermoplastic rubbers or elastomers or natural rubber. The gasket may be shaped to cover the first surface 162 of the rocker 156, including the first extension 172 and the second extension 174. The gasket 158 may have a first surface 176 and a second surface 178 wherein the second surface 178 has a first indent 180 for receiving the first extension 172 and a second indent 182 for receiving the second extension 174. The first surface 176 of the gasket 158 may have a first protrusion 184 corresponding to the first indent 180 and a second protrusion 186 corresponding to the second indent 182. In one embodiment, a portion of gasket 158 is clamped between body 102 and cap 160.

The cap 160 may be sized to encompass the wall 118 of the base 110 of the body 102. The cap 160 may be made of any suitable material including, but not limited to, plastics (e.g., thermoplastics and thermosetting plastics), metals, and combinations thereof. For example, cap 160 can include polycarbonate, thermoplastic polyurethane (TPU), acetyl polymer, and combinations thereof. Cap 160 may be attached to the body 102 by any suitable method including, but not limited to, gluing, ultrasonic welding, or snap fitting. The cap 160 may have a first through opening 188 for receiving the first protrusion 184 of the gasket 158 and a second through opening 190 for receiving the second protrusion 186 of the gasket 158 such that a user may access the first and second protrusions 184, 186 through the first and second through openings 188, 190, respectively.

In some embodiments, piston 104 and interface 108 are integrally connected. For example, piston 104 and rocker 156 can have a one piece construction.

Figure 2:
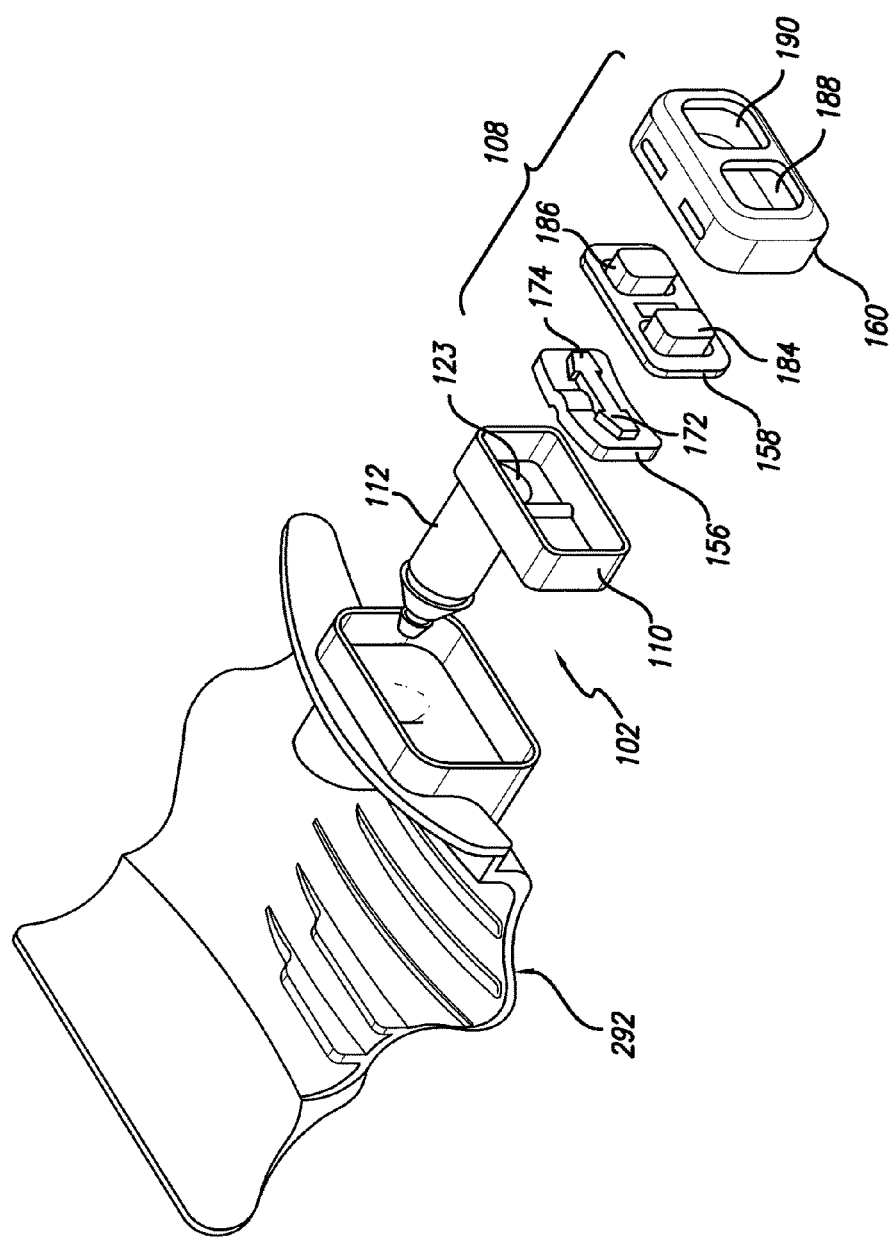
FIG. 2 is a partially exploded view of the exemplary valve according to the first embodiment.
Figure 3:
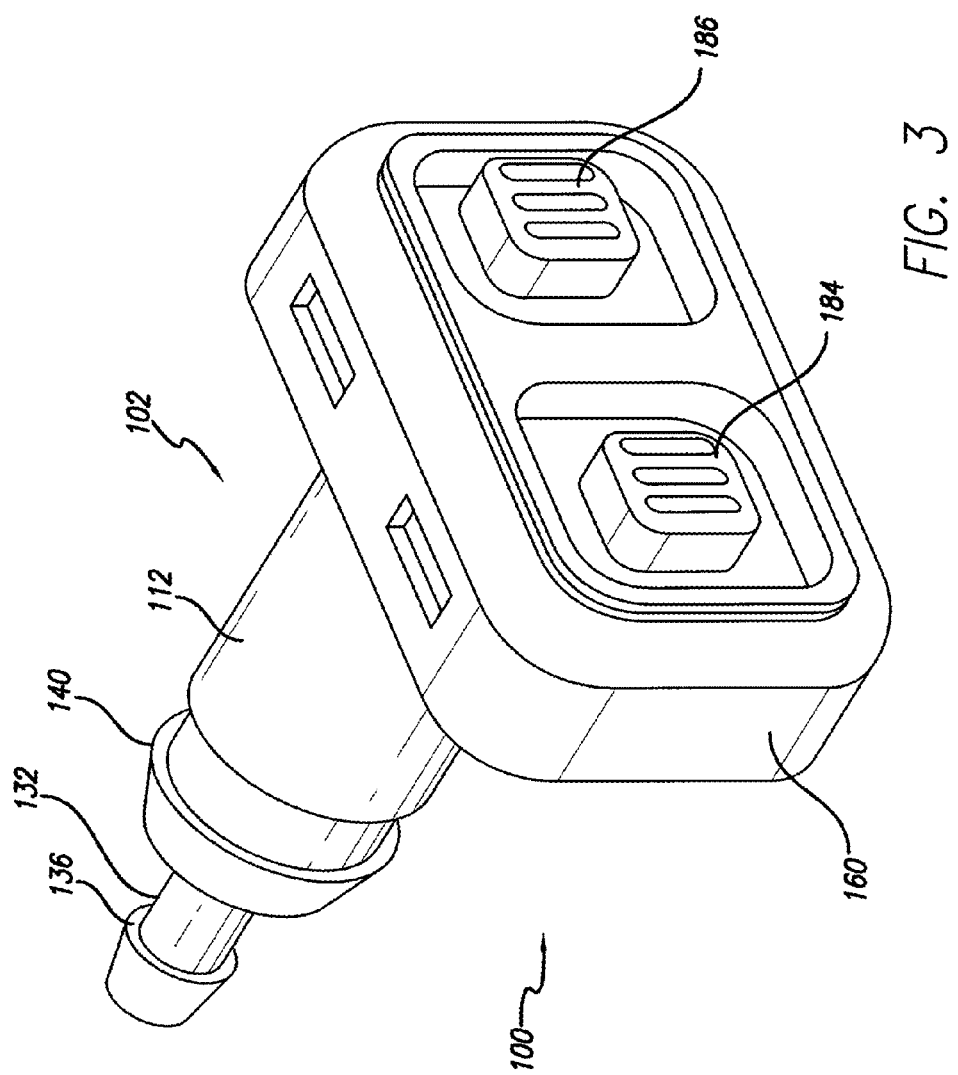
FIG. 3 is a perspective view of the exemplary valve according to the first embodiment.
Figure 4:
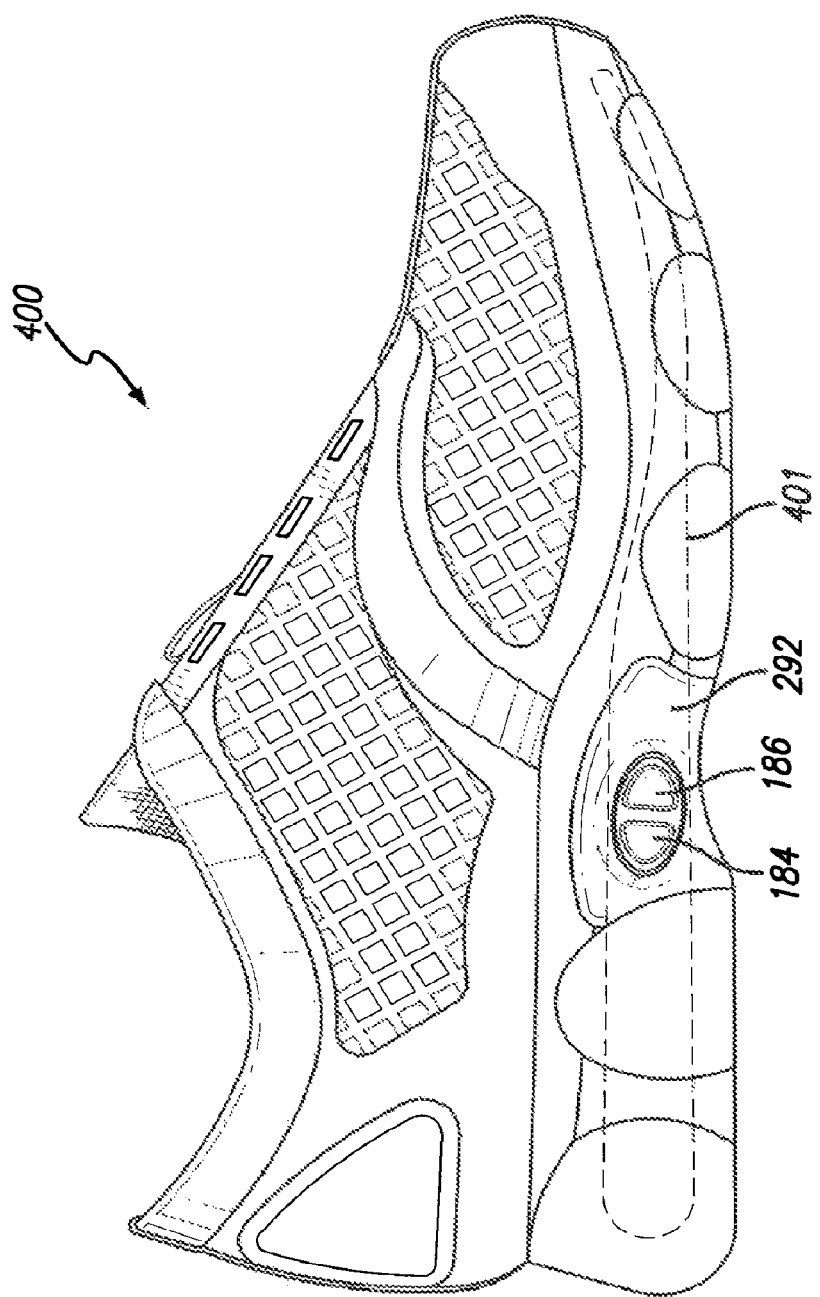
FIG. 4 is a lateral side view of an article of footwear having the exemplary valve of FIG. 1 incorporated therein.

As shown in FIGS. 2 and 4, when the valve 100 is incorporated into an article of footwear 400, the valve 100 may be disposed in a shank 292 of the article of footwear that surrounds the arch region of a sole of the article of footwear 400. The valve 100 may be disposed in the shank 292 on the lateral side of the article of footwear 400 such that the stem 112 is connected to an inflation system of the article of footwear 400 and such that a wearer has access to the interface 108. In an alternative embodiment, the valve 500 or the valve 800 with corresponding shank 692 or 992, respectively, discussed below in more detail, may be incorporated into the article of footwear 400. Alternatively, the valve 100, 500, or 800 may be located in other areas of an article of footwear including, but not limited to, the medial side, the upper, or on an exterior surface of the footwear. It is noted that while FIG. 4 illustrates an article of footwear for a right foot, any of the valves disclosed herein may also be incorporated into an article of footwear for a left foot. The barb 136, 536, or 836 associated with the extension 132, 532, or 832 of the stem 112 or 512, or the body 802 that includes the fluid inlet opening 134, 534, or 834 may be inserted into a manifold of a configurable fluid transfer system that includes the inflatable system such as the one disclosed in U.S. patent application Ser. No. 11/613,982, filed on Dec. 20, 2006, which is incorporated herein by reference in its entirety.

A wearer may press the first and second extensions 172, 174 of the rocker 156 through the first and second protrusions 184, 186, respectively of the gasket 158 to move the rocker 156 back and forth between a first position and a second position. In the first position, the second extension 174 extends further out of the second through opening 190 of the cap 160 than the first extension 172 extends out of the first through opening 188. When the rocker 156 is in the first position and the wearer presses the second extension 174, the groove 168 of the rocker 156 allows the rocker 156 to pivot on the raised portion 166 of the base 110 and move into the second position. This pivoting of the rocker from the first position to the second position causes the second extension 174 to move inward and the first extension 172 to move outward. Thus, in the second position, the first extension 172 extends further out of the first through opening 188 than the second extension 174 extends out of the second through opening 190. The movement of the second extension 174 inward presses the tab 170 of the rocker against the first surface 144 of the piston 104. This in turn pushes the piston 104 within the interior chamber 142 towards the second end 124 of the stem 112 of the body 102. The movement of the piston 104 compresses the spring 106 and causes the overmold 150 of the piston 104 to move closer to and/or press more tightly against end component 126 or first end surface 128.

When the rocker 156 is in the second position and the wearer presses the first extension 172, the groove 168 of the rocker 156 allows the rocker 156 to pivot on the raised portion 166 of the base 110 and move into the first position. This pivoting of the rocker from the second position to the first position causes the first extension 172 to move inward and the second extension 174 to move outward. Thus, in the first position the second extension 174 extends further out of the second through opening 190 than the first extension 172 extends out of the first through opening 188. The movement of the second extension 174 outward causes the tab 170 of the rocker 156 to move away from and/or apply less pressure against the first surface 144 of the piston 104. Then piston 104 can slide within the interior chamber 142 towards the first end 122 of the stem 112 of the body 110. In the illustrated embodiment, the spring 106 decompresses to move the piston and thereby move the overmold 150 away from (or press less tightly against) end component 126 or first end surface 128. The decompression of the spring 106 can aid in the movement of the piston 104 by preventing the overmold 150 of the piston 104 from sticking against first end surface 128. In other embodiments, in lieu of a spring, fluid pressure (e.g., air pressure) at fluid inlet opening 134 can push piston 104 towards the first end 122.

Valve 100 can include a lock mechanism to hold rocker 156 in the first or second positions. For example, rocker 156 can include tab 196, and wall 118 can include a corresponding notch 198. When rocker 156 is in the second position, tab 196 engages notch 198 to maintain the rocker in the second position. When rocker 156 is in the second position and the wearer presses the first extension 172, tab 196 disengages from notch 198 and the rocker pivots and moves into the first position. Preferably, tab 196 or wall 118 are constructed of a resilient material so that tab 196 and notch 198 can be repeatedly engaged and disengaged without substantial damage to the tab or notch.

The interior chamber 142 of the valve 100 may include a fluid chamber 194 that may be defined by the space enclosed by the second surface 146 of the piston, the wall 120 of the stem 112, and the first end surface 128 of the end component 126 of the stem 112. Fluid generally enters into the fluid chamber 194 through the fluid inlet opening 134 and accumulates in the fluid chamber 194 until the fluid exits through the fluid outlet opening 138 to the atmosphere. However, fluid chamber 194 does not need to be air tight and some fluid may escape or enter fluid chamber, for example, through a gap between piston 104 and wall 120. The volume of the fluid chamber 194 may change as the piston 104 slides within the interior chamber 142. The volume of the fluid chamber 194 increases as the piston 104 slides towards the first end 122 of the stem 112 and decreases as the piston 104 slides towards the second end 122 of the stem 112. Thus, when the rocker 156 is in the first position, the fluid chamber has a larger volume, and therefore a larger amount of fluid, than when the rocker 156 is in the second position. Also, the fluid flow rate through the fluid inlet opening 134 and the fluid flow rate out the fluid outlet opening 138 can be larger when the rocker 156 is in the first position than in the second position. In addition, the pressure in the inflation system, including any bladders, can be lower when the rocker 156 is in the first position than in the second position.

In one embodiment, the first position may be a fully open or "on" position for the valve 100 and the second position may be a fully closed or "off" position for the valve 100. In such an embodiment, in the first position the valve 100 is fully open such that any fluid in the inflatable system flows directly into the fluid chamber 194 and out the fluid outlet opening 138 such that the inflatable system remains substantially deflated and has a minimum fluid pressure. Thus, when the rocker 156 is in the first position, the article of footwear may be in a "train" mode more suitable for cross-training where added cushioning or sole height is not desired. In a second position the valve 100 can be fully closed such that fluid remains in the inflatable system and does not flow into the fluid chamber 194 such that the inflatable system inflates and builds fluid pressure. Thus, when the rocker 156 is in the second position, the article of footwear may be in a "run" mode more suitable for running where additional cushioning can be desired. In alternative embodiments, the first position may correspond to the valve 100 being less than fully open and the second position may correspond to the valve 100 being not fully closed but generally valve 100 will be more open in the first position than in the second position.

Figure 5:
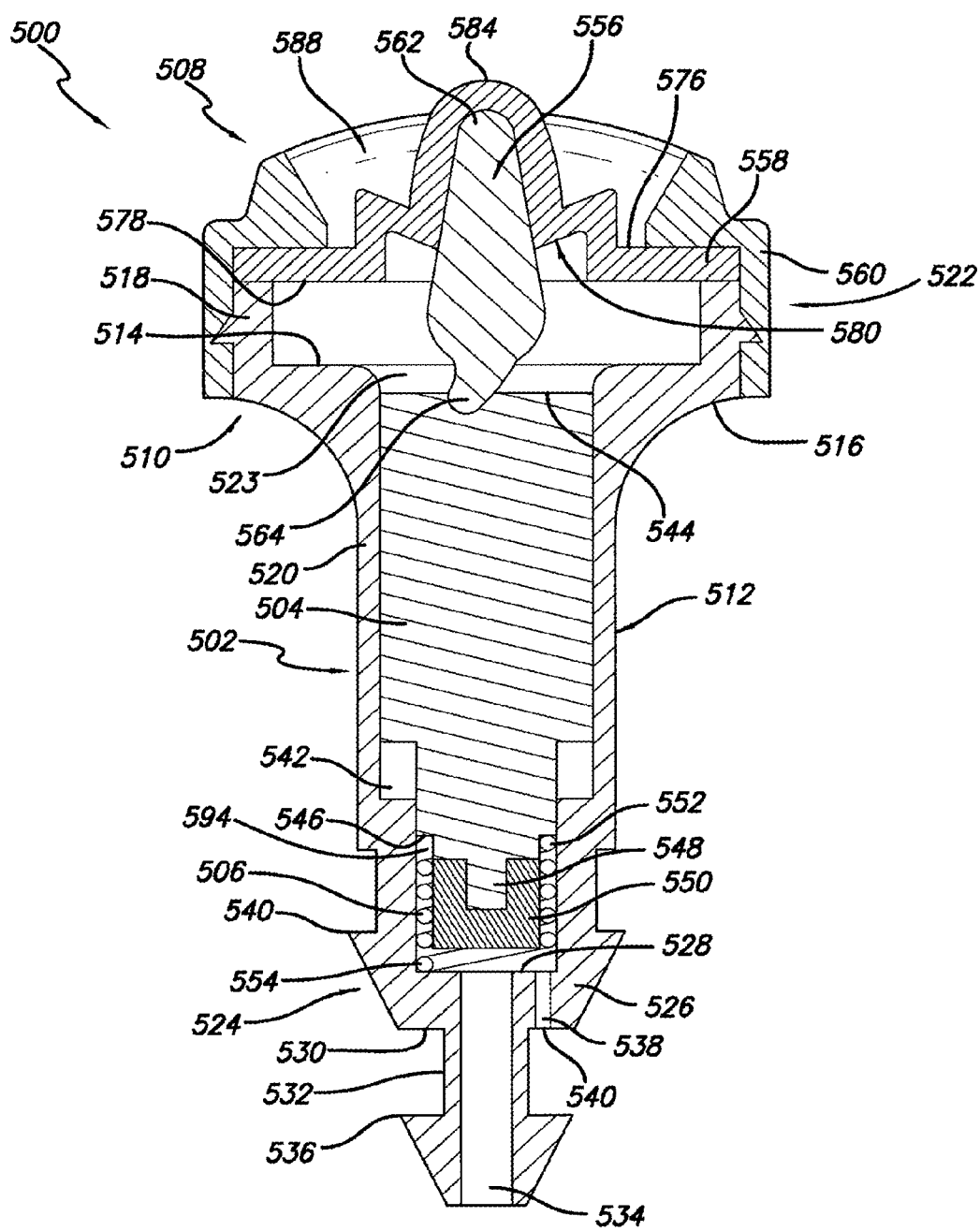
FIG. 5 is a cross-sectional view of an exemplary assembled valve according to a second embodiment.
Figure 6:
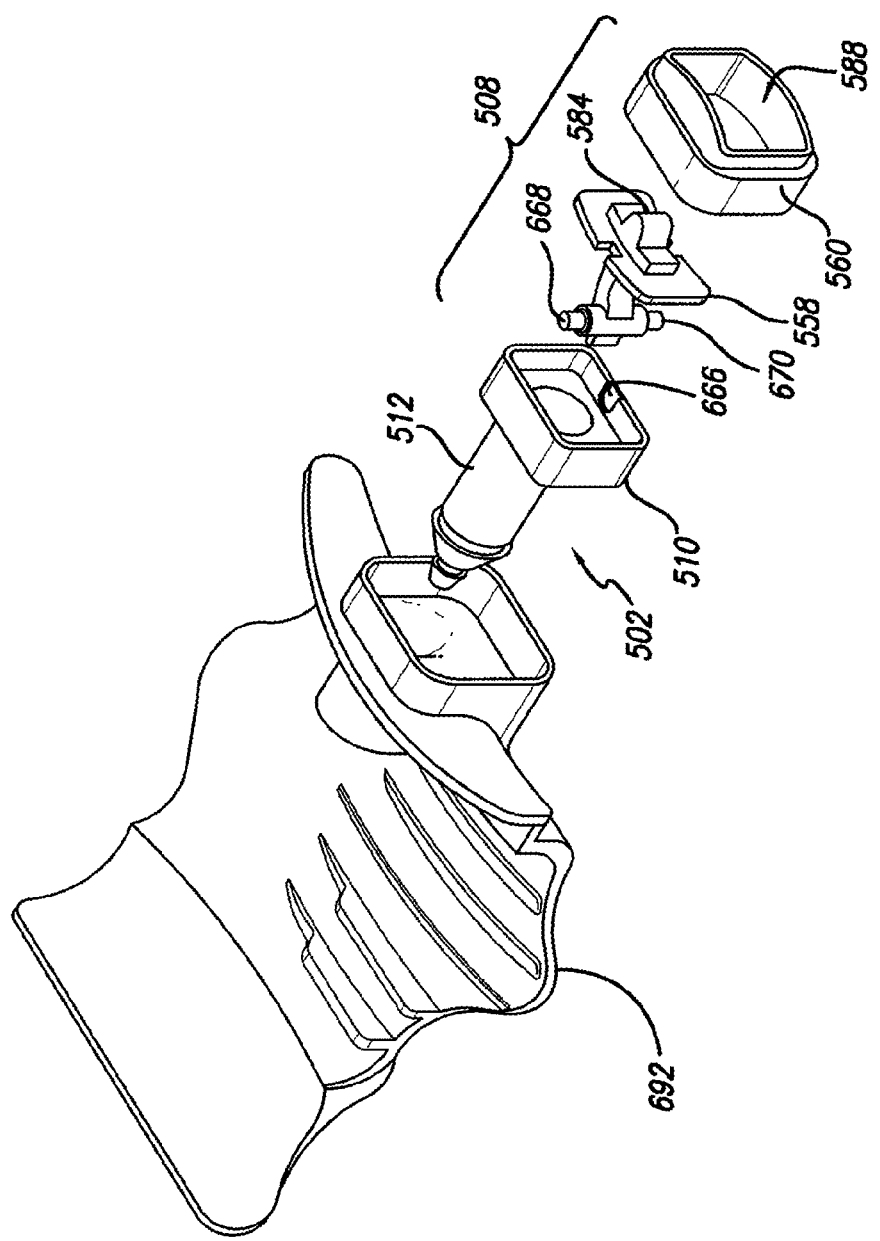
FIG. 6 is a partially exploded view of the exemplary valve according to the second embodiment.
Figure 7:
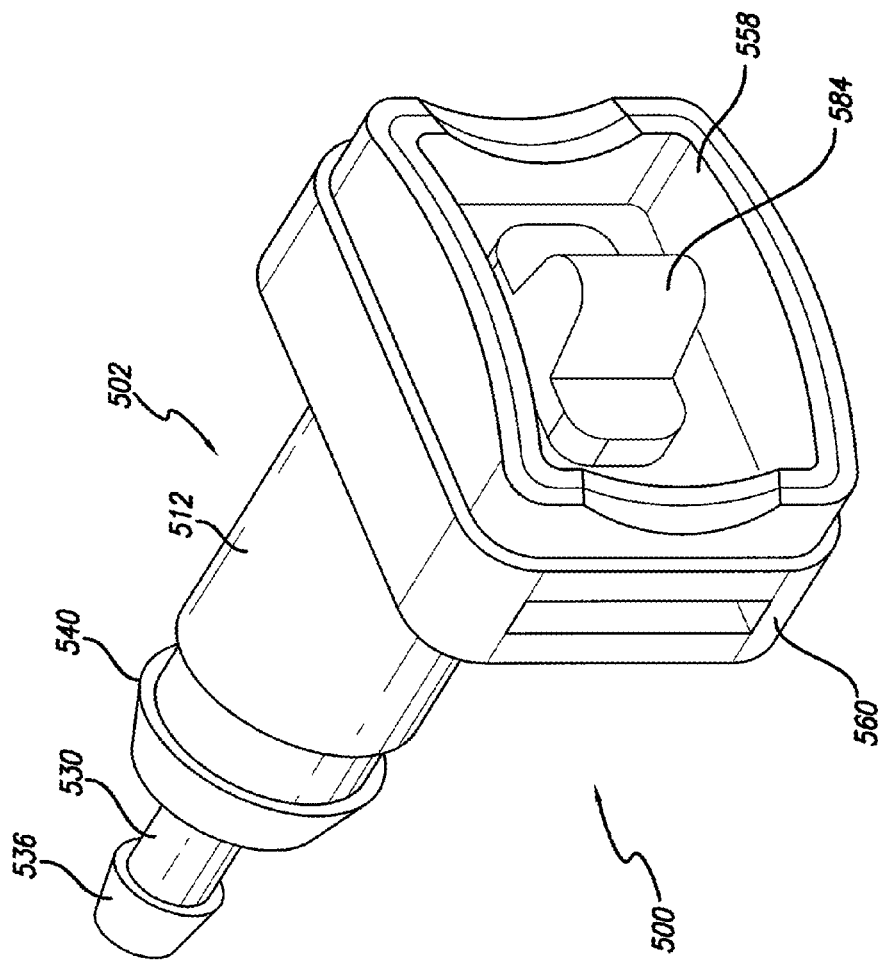
FIG. 7 is a perspective view of the exemplary valve according to the second embodiment.

FIGS. 5-7 illustrate an alternative valve 500. The valve 500 may have a body 502, a piston 504, and an interface 508.

The body 502 may have a base 510 and a stem 512. Body 502, base 510 and stem 512 may be generally any shape. For example, body 502, base 510 and stem 512 may be generally rectangular, square, elliptical, or circular in cross-section. Body 502, base 510, or stem 512 may have a uniform cross-sectional shape and size or the cross-sectional shape and size of body 502, base 510, or stem 512 can vary along the length of the component. In some embodiments, stem 512 is generally cylindrical. The body 502 may be made of any suitable material including, but not limited to, plastics (e.g., thermoplastics and thermosetting plastics), metals, and combinations thereof. For example, body 502 can include polycarbonate, thermoplastic polyurethane (TPU), acetyl polymer, and combinations thereof.

The base 510 may have a first surface 514 and a second surface 516. A wall 518 may extend from the first surface 514 around a periphery of the base 510. The stem 512 may be connected to the base 510 and may comprise a wall 520 extending from a portion of the second surface 516 such that a first end 522 of the stem 512 is adjacent the second surface 516 of the base 510. The base 510 may have an opening 523 that may be surrounded by the wall 520 of the stem. A second end 524 of the stem 512 may be formed from an end component 526 having a first end surface 528 and a second end surface 530. An extension 532 may extend from the second end surface 530 with a fluid inlet opening 534 formed in the extension 532 that extends through the end component 526. The extension 532 may have a barb 536 for maintaining fluid inlet opening 534 within a fluid passage of a fluid system and to create a sealed system. A fluid outlet opening 538 may be formed in the end component 526 of the stem 512. The wall 520 may extend from the first end 522 to the second end 524 of the stem 512. The stem 512 may also have a barb 540 adjacent the second end 524 for maintaining the valve 500 within a fluid system when the body 502 is inserted therein.

The body 502 may have an interior chamber 542 bounded by the wall 518 extending from the first surface 514 of the base 510, the wall 520 of the stem 512, and the first end surface 528 of the end component 526 of the stem 512. The fluid inlet opening 534 and the fluid outlet opening 538 may be in fluid communication with the interior chamber 542.

The piston 504 is slidably positioned within the stem 512 in the interior chamber 542 of the body 502. Piston 504 may be made of any suitable material including, but not limited to, plastics (e.g., thermoplastics and thermosetting plastics), rubbers, metals, and combinations thereof. For example, piston 504 can include polycarbonate, thermoplastic polyurethane (TPU), acetyl polymer, polytetrafluoroethylene, and combinations thereof. In some embodiments, piston 504 includes one or more low friction materials. The piston 504 may have a first surface 544 and a second surface 546 with an extension 548 extending from the second surface 546. The piston 504 and extension 548 may be generally any shape. For example, piston 504 and extension 548 may be generally rectangular, square, elliptical, or circular in cross-section. Piston 504 and extension 548 may have uniform cross-sectional shapes and sizes or the cross-sectional shapes and sizes of piston 504 and extension 548 can vary along the lengths of the components. In one embodiment, piston 504 may be cylindrical in shape and the extension 548 may also be cylindrical in shape.

An overmold 550 may optionally surround the extension 548 and contact the second surface 546 of the piston such that, for example, the overmold 550 may appear cylindrical in shape when covering a cylindrical piston. Overmold 550 can include various materials such as, for example, polycarbonate, thermoplastic polyurethane (TPU), acetyl polymer, polytetrafluoroethylene, and combinations thereof, or other materials that can provide a good seal of fluid inlet opening 534 or that release easily from the materials or structures at or on end surface 528. In some embodiments, extension 548 includes at least one hole extending into or through extension 548 such that when a material is overmolded onto extension 548, the material fills the hole and the overmold is thereby held tight to the extension 548.

In some embodiments, a seal (e.g., an elastomeric, rubber, or polytetrafluoroethylene pad or ring) for blocking or covering fluid inlet opening 534 is attached to an end of piston 504. For example, piston 504 can include a groove for holding an O-ring seal. In other embodiments, piston 504 is adapted for holding a pad-style seal. Generally, piston 504, extension 548, overmold 550, or seal (not shown) opens and closes fluid inlet opening 534 when the piston slides within the stem 512. In some embodiments, piston 504, extension 548, overmold 550, or seal (not shown) closes fluid inlet opening 534 by making contact with end surface 528 when the piston slides within the stem 512. In other embodiments, piston 504, extension 548, overmold 550, or seal (not shown) closes fluid inlet opening 534 by making contact with a structure (e.g., a raised ring or gasket surrounding the opening of fluid inlet opening 534) (not shown) on end surface 528 when the piston slides within the stem 512.

The piston 504 may have one or more guides (not shown) extending from the side for engagement with one or more guide grooves (not shown) within the wall 520 of the stem 512 in the interior chamber 542 for guiding the movement of the piston 504 as it moves up and down within the stem 512. Alternatively, piston 504 may have one or more guide grooves (not shown) for engagement with one or more guides (not shown) on wall 520 of stem 512 in interior chamber 542 for guiding the movement of piston 504.

In some embodiments, piston 504 is spring actuated. For example, valve 500 can include a spring 506 positioned between body 502 and piston 504. Valve 500 can include one or more of various springs including, but not limited to, tension springs, compression springs, wire springs, coil springs, helical springs, flat springs, leaf springs, gas springs, band springs (e.g., rubber bands or other elastic bands), other elastic materials, and combinations thereof. In some embodiments, spring 506 may be a coil spring having a first end 552 and a second end 554 and may be made out of a suitable material including, but not limited to, stainless steel. The spring 506 may be positioned within the stem 512 in the interior chamber 542 of the body 502 between the end component 526 at the second end 524 of the stem 512 and the piston 504. The first end 552 of the spring 506 may contact the second surface 546 of the piston 504 and may surround the overmold 550. The second end 554 of the spring 506 may contact the first end surface 528 of the end component 526 at the second end 524 of the stem 512 and may surround the fluid inlet opening 534. The spring 506 may compress and decompress as the piston 504 moves up and down within the stem 512. In other embodiments, a spring may be positioned at first end 522 of stem 512 and above piston 504 such as, for example, between piston 504 and cap 560. In yet other embodiments, a spring is located within piston 504.

The interface 508 is connected to the base 510 of the body 502 and may contact the piston 504 such that when the interface 508 is moved between a first position and a second position the piston 504 moves between a first position and a second position. The interface 508 may be a toggle switch and may include a cam 556, a gasket 558, and a cap 560. The cam 556 may have a first end 562 and a second end 564 and may be made of any suitable material including, but not limited to, plastics (e.g., thermoplastics and thermosetting plastics), rubbers, metals, and combinations thereof. For example, cam 556 can include polycarbonate, thermoplastic polyurethane (TPU), acetyl polymer, and combinations thereof. The cam 556 may also have a first side extension 668 and a second side extension 670 which fit into corresponding slots 666 in the wall 518 of the base 510 of the body 502 for holding the cam 556 in place while allowing it to being toggled back and forth. The first and second ends 562, 564 of the cam 556 may be rounded. The second end 564 of the cam 556 may extend through the opening 523 in the base 510 of the body 502 and may contact the first surface 544 of the piston 504.

The gasket 558 may be any suitable flexible material including, but not limited to, thermoplastic rubbers or elastomers or natural rubber. The gasket 558 may be shaped to cover the first end 562 of the cam 556. The gasket 558 may have a first surface 576 and a second surface 578 wherein the second surface 578 has an indent 580 for receiving the first end 562 of the cam 556. The first surface 576 of the gasket 558 may have a protrusion 584 corresponding to the indent 580. In one embodiment, a portion of gasket 558 is clamped between body 502 and cap 560.

The cap 560 may be sized to encompass the wall 518 of the base 510 of the body 502. The cap 560 may be made of any suitable material including, but not limited to, plastics (e.g., thermoplastics and thermosetting plastics), metals, and combinations thereof. For example, cap 560 can include polycarbonate, thermoplastic polyurethane (TPU), acetyl polymer, and combinations thereof. Cap 560 may be attached to the body 502 by any suitable method including, but not limited to, gluing, ultrasonic welding, or snap fitting. The cap 560 may have a through opening 588 for receiving the protrusion 584 of the gasket 558 such that a user may access the protrusion 584 through the through opening 588.

A wearer may push the first end 562 of the cam 556 via the protrusion 584 of the gasket 558 to toggle and move cam 556 back and forth between a first position and a second position. In the first position the first end 562 of the cam 556 is slanted to the right and the second end 564 of the cam 556 is slanted to the left. When the cam 556 is in the first position and the wearer pushes the first end 562 of the cam 556 to the left, the cam 556 rotates about the first and second side extensions 668, 670 and moves or toggles into the second position. This rotation of the cam 556 from the first position to the second position causes the second end 564 of the cam 556 to move from the left to the right. The movement of the first end 562 to the left and the second end 564 to the right presses the second end 564 of the cam 556 against the first surface 544 of the piston 504. This in turn pushes the piston 504 within the interior chamber 542 towards the second end 524 of the stem 512 of the body 510. The movement of the piston 504 compresses spring 506 and moves overmold 550 of the piston 504 closer to and/or press more tightly against end component 526 or first end surface 528.

When the valve 500 is in the second position and the wearer pushes the first end 562 of the cam 556 from the left to the right, the cam 556 rotates about the first and second side extensions 668, 670 and moves or toggles into the first position. This rotation of the cam 556 from the second position to the first position causes the second end 564 of the cam 556 to move from the right to the left. The movement of the first end 562 to the right and the second end 564 to the left causes the second end 564 of the cam 556 to move away from and/or apply less pressure against the first surface 544 of the piston 504. Then piston 504 can slide within the interior chamber 542 towards the first end 522 of the stem 512. In the illustrated embodiment, spring 506 decompresses to move the piston and thereby move the overmold 550 away from (or press less tightly against) end component 526 or first end surface 528. The decompression of the spring 506 can aid in the movement of the piston 504 by preventing the overmold 550 of the piston 504 from sticking against first end surface 528. In other embodiments, in lieu of a spring, fluid pressure (e.g., air pressure) at fluid inlet opening 534 can push piston 504 towards the first end 522.

In other embodiments, the first end 562 of the cam 556 may be slanted to the left in the first position and to the right in the second position and the second end 564 of the cam 556 may be slanted to the right in the first position and to the left in the second position.

As discussed above with reference to the valve 100, the interior chamber 542 of the valve 500 may include a fluid chamber 594 that may be defined by the space enclosed by the second surface 546 of the piston, the wall 520 of the stem 512, and the first end surface 528 of the end component 526 of the stem 512. Fluid generally enters into the fluid chamber 594 through the fluid inlet opening 534 and accumulates in the fluid chamber 594 until the fluid exits through the fluid outlet opening 538 to the atmosphere. However, fluid chamber 594 does not need to be air tight and some fluid may escape or enter fluid chamber, for example, through a gap between piston 504 and wall 520. The volume of the fluid chamber 594 may change as the piston 504 slides within the interior chamber 542. The volume of the fluid chamber 594 increases as the piston 504 slides towards the first end 522 of the stem 512 and decreases as the piston 504 slides towards the second end 524 of the stem 512. Thus, when the cam 556 is in the first position, the fluid chamber has a larger volume, and therefore a larger amount of fluid, than when the cam 556 is in the second position. Also, the fluid flow rate through the fluid inlet opening 534 and the fluid flow rate out the fluid outlet opening 538 can be larger when the cam 556 is in the first position than in the second position. In addition, the pressure in the inflation system, including any bladders, can be lower when the cam 556 is in the first position than in the second position.

As discussed above with reference to the valve 100, in one embodiment, the first position may be a fully open or "on" position for the valve 500 and the second position may be a fully closed or "off" position. In such an embodiment, in the first position the valve 500 is fully open such that any fluid in the inflatable system flows directly into the fluid chamber 594 and out the fluid outlet opening 538 such that the inflatable system remains substantially deflated and has a minimum fluid pressure. Thus, when cam 556 is in the first position, the article of footwear may be in a "train" mode more suitable for cross-training. In the second position, the valve 500 is fully closed such that fluid remains in the inflatable system and does not flow into the fluid chamber 594 such that the inflatable system inflates and builds fluid pressure. Thus, when the cam 556 is in the second position, the article of footwear may be in a "run" position more suitable for running. In alternative embodiments, the first position may correspond to the valve 500 being less than fully open and the second position may correspond to the valve 500 being not fully closed but, generally valve 500 will be more open in the first position than in the second position.

Figure 8:
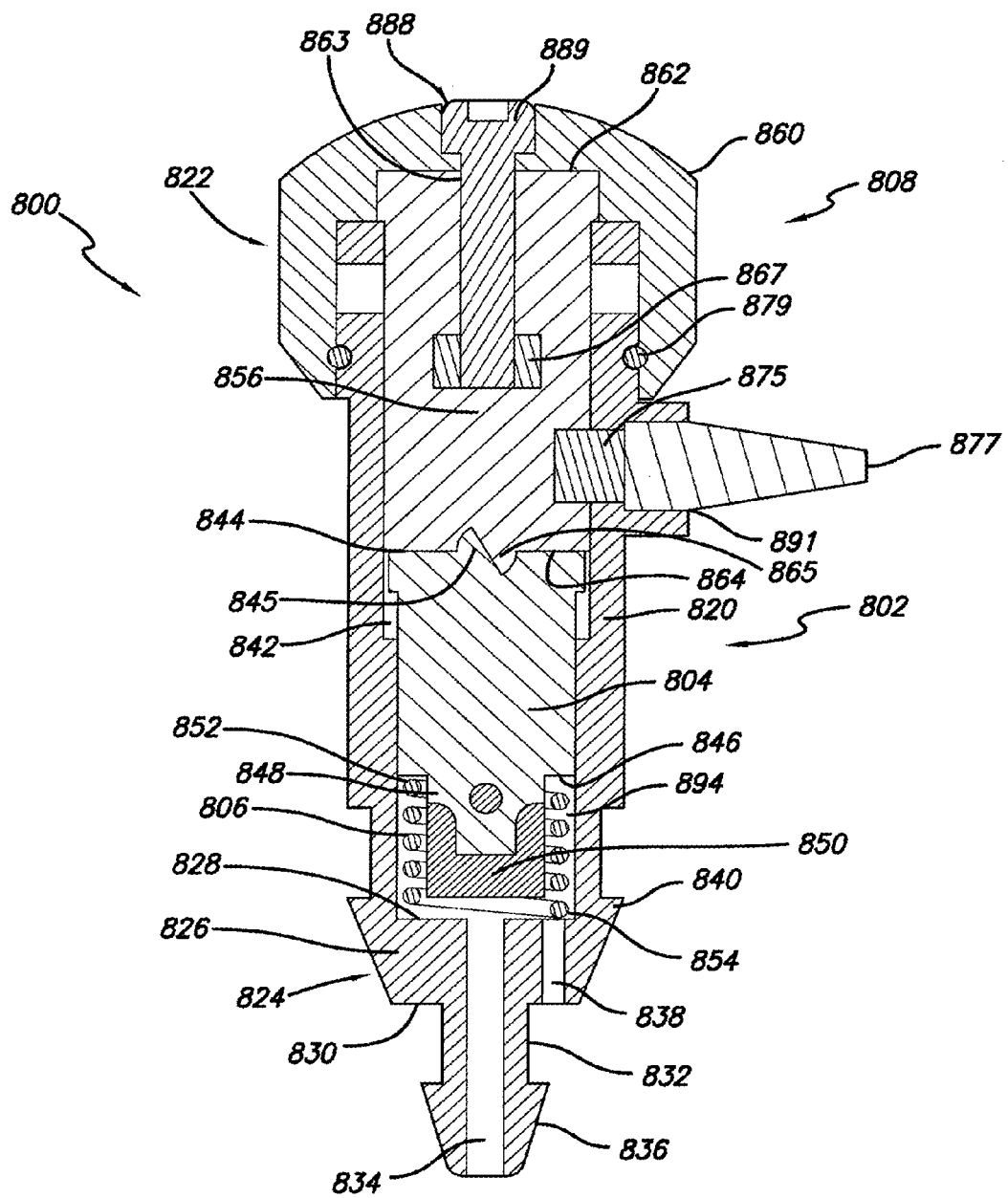
FIG. 8 is a cross-sectional view of an exemplary assembled valve according to a third embodiment.
Figure 9:
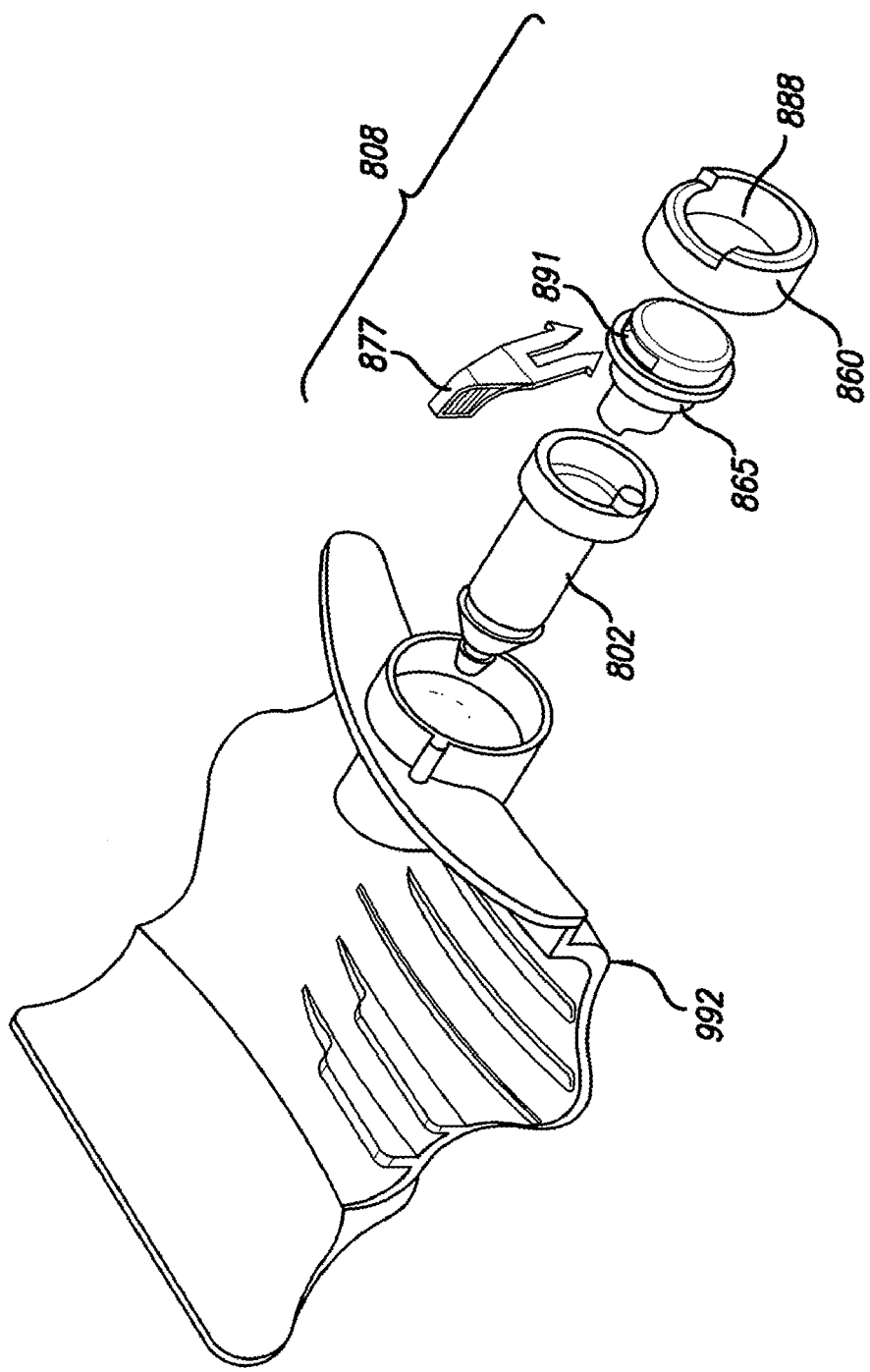
FIG. 9 is a partially exploded view of the exemplary valve according to the third embodiment.

FIGS. 8-9 illustrate another alternative valve 800. The valve 800 may have a body 802, a piston 804, and an interface 808.

The body 802 may be generally cylindrical in shape and may be made of any suitable material including, but not limited to, plastics (e.g., thermoplastics and thermosetting plastics), metals, and combinations thereof. For example, body 802 can include polycarbonate, thermoplastic polyurethane (TPU), acetyl polymer, and combinations thereof. The body 802 may comprise a wall 820 extending from a first end 822 of the body 802 to a second end 824 of the body 802. The second end 824 of the body 802 may be formed from an end component 826 having a first end surface 828 and a second end surface 830. An extension 832 may extend from the second end surface 830 with a fluid inlet opening 834 formed in the extension 832 and extending through the end component 826. The extension 832 may have a barb 836 for maintaining fluid inlet opening 834 within a fluid passage of a fluid system and to create a sealed system. A fluid outlet opening 838 may be formed in the end component 826 of the body 802. The body 802 may also have a barb 840 adjacent the second end 824 for maintaining the valve 800 within a fluid system when the body 802 is inserted therein. The first end 822 of the body 802 may include a generally circular opening that may lead to an interior chamber 842 of the body 802 defined by the wall 820 and the first end surface 828 of the end component 826. The fluid inlet opening 834 and the fluid outlet opening 838 may be in communication with the interior chamber 842.

The piston 804 is slidably positioned within the interior chamber 842 of the body 802. Piston 804 may be made of any suitable material including, but not limited to, plastics (e.g., thermoplastics and thermosetting plastics), rubbers, metals, and combinations thereof. For example, piston 804 can include polycarbonate, thermoplastic polyurethane (TPU), acetyl polymer, polytetrafluoroethylene, and combinations thereof. In some embodiments, piston 804 includes one or more low friction materials. The piston 804 may have a first surface 844 and a second surface 846 with an extension 848 extending from the second surface 846. The piston 804 may be generally cylindrical in shape and the extension 848 may also be cylindrical in shape. An overmold 850 may optionally surround the extension 848 and contact the second surface 846 of the piston such that the overmold 850 may appear cylindrical in shape. Overmold 850 can include various materials such as, for example, polycarbonate, thermoplastic polyurethane (TPU), acetyl polymer, polytetrafluoroethylene, and combinations thereof, or other materials that can provide a good seal of fluid inlet opening 834 or that release easily from the materials or structures at or on end surface 828. In some embodiments, extension 848 includes at least one hole extending into or through extension 848 such that when a material is overmolded onto extension 848, the material fills the hole and the overmold is thereby held tight to the extension 848.

In some embodiments, a seal (e.g., an elastomeric, rubber, or polytetrafluoroethylene pad or ring) for blocking or covering fluid inlet opening 834 is attached to an end of piston 804. For example, piston 804 can include a groove for holding an O-ring seal. In other embodiments, piston 804 is adapted for holding a pad-style seal. Generally, piston 804, extension 848, overmold 850, or seal (not shown) opens and closes fluid inlet opening 834 when the piston slides within the stem 812. In some embodiments, piston 804, extension 848, overmold 850, or seal (not shown) closes fluid inlet opening 834 by making contact with end surface 828 when the piston slides within the stem 812. In other embodiments, piston 804, extension 848, overmold 850, or seal (not shown) closes fluid inlet opening 834 by making contact with a structure (e.g., a raised ring or gasket surrounding the opening of fluid inlet opening 834) (not shown) on end surface 828 when the piston slides within the stem 812.

The piston may have one or more guides (not shown) extending from the side for engagement with one or more guide grooves (not shown) within the wall 820 of the body 802 in the interior chamber 842 for guiding the movement of the piston 804 as it moves up and down within the interior chamber 842. Alternatively, the piston 804 may have one or more guide grooves (not shown) for engagement with one or more guides (not shown) on wall 820 of stem 812 in interior chamber 842 for guiding the movement of piston 804.

The first surface 844 of the piston 804 may have one or more ramps 845 extending therefrom. The one or more ramps 845 may be a smooth surface or may be notched or otherwise grooved for interlocking with corresponding ramps of the interface 808.

In some embodiments, piston 804 is spring actuated. For example, valve 800 can include a spring 806 positioned between body 802 and piston 804. Valve 800 can include one or more of various springs including, but not limited to, tension springs, compression springs, wire springs, coil springs, helical springs, flat springs, leaf springs, gas springs, band springs (e.g., rubber bands or other elastic bands), other elastic materials, and combinations thereof. In some embodiments, spring 806 may be a coil spring having a first end 852 and a second end 854 and may be made out of a suitable material including, but not limited to, stainless steel. The spring 806 may be positioned in the interior chamber 842 of the body 802 between the end component 826 at the second end 824 of the body 802 and the piston 804. The first end 852 of the spring 806 may contact the second surface 846 of the piston 804 and may surround the overmold 850. The second end 854 of the spring 806 may contact the first end surface 828 of the end component 826 at the second end 824 of the body 802 and may surround the fluid inlet opening 834. The spring 806 can compress and decompress as the piston 804 moves up and down within the interior chamber 842 of the body 802. In other embodiments, a spring may be positioned at first end 822 of stem 812 and above piston 804 such as, for example, between piston 804 and shaft 856. In yet other embodiments, a spring is located within piston 804.

The interface 808 is connected to the body 802 and may contact the piston 804 such that when the interface 808 is moved between a first position and a second position the piston 804 moves between a first position and a second position. The interface 808 may be made of any suitable material including, but not limited to, plastics (e.g., thermoplastics and thermosetting plastics), rubbers, metals, and combinations thereof. For example, interface 808 can include polycarbonate, thermoplastic polyurethane (TPU), acetyl polymer, and combinations thereof. The interface 808 may be rotatable and may include a shaft 856 and a cap 860. The shaft 856 may have a first surface 862 and a second surface 864. The second surface 864 of the shaft 856 may have one or more ramps 865 extending therefrom. The one or more ramps 865 may have a smooth surface or may be notched or otherwise grooved for interlocking with corresponding ramps 845 of the piston 804. Alternatively, the one or more ramps 865 may have a varying slope, such as for example, an S-shape.

The cap 860 may be sized to encompass the wall 820 of the body 802. The cap 860 may be made of any suitable material including, but not limited to, plastics (e.g., thermoplastics and thermosetting plastics), rubbers, metals, and combinations thereof. For example, cap 860 can include polycarbonate, thermoplastic polyurethane (TPU), acetyl polymer, zinc alloy, and combinations thereof. The cap 860 may have a through hole opening 888 through which a bolt 889 is inserted. The shaft 856 may have an opening 863 formed in the first surface 862. A nut 867 may be disposed in the opening 863. The bolt 889 may extend into the opening 863 and be screwed into the nut 867 to thereby secure the cap 860 to the shaft 856. The bolt 889 and the nut 867 may be made of suitable material including, but not limited to, stainless steel. Pin 875 can be fixed into shaft 856 to hold shaft 856 within body 802 and to allow rotation of shaft 856 within body 802. In certain embodiments, pin 875 holds shaft 856 within body 802 and a wearer actuates the valve by turning cap 860. In one embodiment, pin 875 extends from body 802 to form handle 877 which together travel within a groove 891 in body 802. In such an embodiment, a wearer can use handle 877 to rotate shaft 856 and actuate valve 800; handle 877 provides a grip for a wearer to rotate the interface 808. In some embodiments, an O-ring 879 positioned between the cap 860 and the body 802 can prevent debris from entering valve 800.

A wearer may turn the cap 860 or handle 877 to rotate the shaft 856 back and forth between a first position and a second position. When the shaft 856 is in the first position and the wearer turns or rotates the handle 877, the shaft 856 moves into the second position. This rotation of the shaft 856 from the first position to the second position causes the second surface 864 of the shaft 856 to rotate such that the one or more ramps 865 of the shaft 856 interlock with the one or more ramps 845 of the piston 804. Since the piston 804 may have guides (not shown) that fit within grooves (not shown) in the wall 820 of the body 802, the rotational force of shaft 856 against the piston 804 is translated into a downward force on the piston 804. Thus, the interlocking of the ramps causes the piston 504 to slide within the interior chamber 842 towards the second end 824 of the body 802. The movement of the piston 804 causes the spring 806 to compress and causes the overmold 850 of the piston 804 to move closer to and/or press more tightly against end component 826 or first end surface 828.

When the shaft 856 is in the second position and the wearer turns or rotates the handle 877, the shaft 856 moves into the first position. This rotation of the shaft 856 from the second position to the first position causes the second surface 864 of the shaft 856 to rotate such that the one or more ramps 865 of the shaft 856 disengage, move away from, or slide along the one or more ramps 845 of the piston 804. This in turn causes the piston 804 to slide within the interior chamber 842 towards the first end 822 of the body 802. In the illustrated embodiment, spring 806 decompresses to move the overmold 850 of the piston 804 away from (or press less tightly against) end component 826 or first end surface 828. The decompression of the spring 806 can aid in the movement of the piston 804 by preventing the overmold 850 of the piston 804 from sticking against first end surface 828. In other embodiments, in lieu of a spring, fluid pressure (e.g., air pressure) at fluid inlet opening 834 can push piston 804 towards the first end 822.

As discussed above with reference to the valves 100 and 500, the interior chamber 842 of the valve 800 may include a fluid chamber 894 that may be defined by the space enclosed by the second surface 846 of the piston, the wall 820 of the body 802, and the first end surface 828 of the end component 826 of the body 802. Fluid generally enters into the fluid chamber 894 through the fluid inlet opening 834 and accumulates in the fluid chamber 894 until the fluid exits through the fluid outlet opening 838 to the atmosphere. However, fluid chamber 894 does not need to be air tight and some fluid may escape or enter fluid chamber 894, for example, through a gap between piston 804 and wall 820. The volume of the fluid chamber 894 may change as the piston 804 slides within the interior chamber 842. The volume of the fluid chamber 894 increases as the piston 804 slides towards the first end 822 of the body 802 and decreases as the piston 804 slides towards the second end 824 of the body 802. Thus, when the valve 800 is in the first position, the fluid chamber has a larger volume, and therefore a larger amount of fluid, than when the valve 800 is in the second position. Also, the fluid flow rate through the fluid inlet opening 834 and the fluid flow rate out the fluid outlet opening 838 can be larger when the valve 800 is in the first position than in the second position. In addition, the pressure in the inflation system, including any bladders, can be lower when the valve 800 is in the first position than in the second position.

As discussed above with reference to the valves 100 and 500, in one embodiment, the first position may be a fully open or "on" position for the valve 800 and the second position may be a fully closed or "off" position. In such an embodiment, in the first position the valve 800 is fully open such that any fluid in the inflatable system flows directly into the fluid chamber 894 and out the fluid outlet opening 838 such that the inflatable system remains substantially deflated and has a minimum fluid pressure. Thus, when shaft 856 is in the first position, the article of footwear may be in a "train" mode more suitable for cross-training. In the second position, the valve 800 is fully closed such that fluid remains in the inflatable system and does not flow into the fluid chamber 894 such that the inflatable system inflates and builds fluid pressure. Thus, when the shaft 856 is in the second position, the article of footwear may be in a "run" position more suitable for running. In alternative embodiments, the first position may correspond to the valve 800 being less than fully open and the second position may correspond to the valve 800 being not fully closed, but generally valve 800 will be more open in the first position than in the second position.

As discussed above, the valves disclosed herein may be incorporated into an article footwear (e.g., article of footwear 400) having an inflatable system that may comprise one or more inflatable bladders (e.g., bladder 401). The valves disclosed herein may be designed to withstand the maximum pressure for which the inflatable system is designed. In some embodiments, the maximum pressure may be about 10 pounds per square inch (psi), about 15 psi, about 20 psi, about 25 psi, about 30 psi, or the maximum pressure generated by a wearer using an inflation mechanism.

The fluid transfer system disclosed herein may be incorporated as part of an "intelligent" system wherein the valve may be controlled by a microprocessor and motor disposed in the footwear and one or more sensors for detecting real-time conditions rather than or in addition to being controlled by the user. The user interface may also provide output of certain data or conditions to the user. As will be appreciated to those of ordinary skill in the art, other features of an "intelligent" shoe system, including, but not limited to, a power source, may be incorporated. An exemplary "intelligent" shoe system is disclosed in, for example, U.S. Pat. No. 7,188,439 to DiBenedetto et al., the disclosure of which is incorporated herein by reference thereto in its entirety.

The valves disclosed herein when incorporated into an article of footwear having an inflatable system may provide the wearer with effectively two pairs of footwear in a single pair. The valves disclosed herein may be switched back and forth between a "train" setting and a "run" setting or an "on" setting and an "off" setting. In the "train" or "off" setting, the valves disclosed herein can be open and air entering the inflatable system exits soon thereafter through the valve disclosed herein. In the "run" or "on" setting, the valves disclosed herein can be closed and air entering the inflatable system can inflate the system. Accordingly, the valves disclosed herein can eliminate the need for separate pairs of cross-training footwear and running footwear or can provide footwear with cushioning characteristics that are easily adjusted by the wearer.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An article of footwear, comprising:

a bladder; and a valve in communication with said bladder, said valve comprising:

a body having a first end, a second end, and an interior chamber between the first and second ends, wherein the second end of the body has a fluid inlet opening in communication with the bladder and a separate fluid outlet opening;

a piston having a first end and a second end, wherein the piston is located within the interior chamber of the body; and an interface connected to the first end of the body, wherein movement of the interface between a first position and a second position results in the piston moving between a first position wherein fluid is permitted to enter the interior chamber at a first rate and a second position wherein fluid is permitted to enter the interior chamber at a second rate, wherein the first rate is greater than the second rate.

2. The article of footwear of claim 1, wherein the interface comprises a rocker that moves between the first position and the second position.

3. The article of footwear of claim 2, wherein the rocker moves on a pivot formed in the interior chamber of the body.

4. The article of footwear of claim 3, wherein the rocker comprises:

a first surface, the first surface having a groove to sit on the pivot and a tab that contacts and pushes against the first end of the piston; and a second surface, the second surface having a first extension on one side of the groove and a second extension on another side of the groove;

wherein pushing the first extension causes the interface to pivot from the second position to the first position and wherein pushing the second extension causes the interface to pivot from the first position to the second position.

5. The article of footwear of claim 4, wherein the valve further comprises a cap attached to the first end of the body, wherein the cap has a first opening providing access to the first extension of the rocker and a second opening providing access to the second extension of the rocker.

6. The article of footwear of claim 5, wherein the valve further comprises a gasket covering the first surface of the rocker.

7. The article of footwear of claim 1, wherein the second rate is about zero.

8. The article of footwear of claim 1, wherein the interface comprises a cam that toggles between the first position and the second position.

9. The article of footwear of claim 1, wherein the interface comprises a shaft that rotates between the first position and the second position.

10. The article of footwear of claim 1, wherein the piston is spring actuated.

11. The article of footwear of claim 10, wherein the valve further includes a spring acting between the body and the piston.

12. An article of footwear, comprising:
a bladder; and
a valve in communication with said bladder, said valve comprising:
  a body having a first end, a second end, and an interior chamber, wherein the second end of the body has a fluid inlet in communication with the bladder and a fluid outlet;
  a piston having a first end and a second end, wherein the piston is located within the interior chamber of the body; and
  an interface connected to the first end of the body, wherein the interface comprises a rocker that pivots between a first position and a second position and wherein pivoting of the rocker between the first position and the second position results in the piston moving between a first position wherein fluid is permitted to enter the interior chamber at a first rate and a second position wherein fluid is permitted to enter the interior chamber at a second rate, wherein the first rate is greater than the second rate.

13. The article of footwear of claim 12, wherein the rocker comprises:
  a first surface, the first surface having a groove to sit on a pivot and a tab that contacts and pushes against the first end of the piston; and
  a second surface, the second surface having a first extension on one side of the groove and a second extension on another side of the groove;
  wherein pushing the first extension causes the interface to pivot from the second position to the first position and wherein pushing the second extension causes the interface to pivot from the first position to the second position.

14. The article of footwear of claim 13, wherein the valve farther comprises a cap attached to the first end of the body, wherein the cap has a first opening providing access to the first extension of the rocker and a second opening providing access to the second extension of the rocker.

15. The article of footwear of claim 14, wherein the valve further comprises a gasket covering the first surface of the rocker.

16. The article of footwear of claim 12, wherein the second rate is about zero.

17. The article of footwear of claim 12, wherein the piston is spring actuated.

18. The article of footwear of claim 17, wherein the valve further includes a spring acting between the body and the piston.

* * * * *